United States Patent
Allgaier et al.

(10) Patent No.: US 9,904,347 B2
(45) Date of Patent: Feb. 27, 2018

(54) FIELD DEVICE

(71) Applicant: VEGA Grieshaber KG, Wolfach (DE)

(72) Inventors: Volker Allgaier, Haslach i.K. (DE); Holger Staiger, Hardt (DE)

(73) Assignee: Vega Grieshaber KG, Wolfach (DE)

( * ) Notice: Subject to any disclaimer, the term of this patent is extended or adjusted under 35 U.S.C. 154(b) by 369 days.

(21) Appl. No.: 14/328,235

(22) Filed: Jul. 10, 2014

(65) Prior Publication Data
US 2015/0039924 A1 Feb. 5, 2015

(30) Foreign Application Priority Data
Jul. 24, 2013 (EP) ..................................... 13177849

(51) Int. Cl.
| | | |
|---|---|---|
| G06F 1/32 | (2006.01) | |
| G05B 19/042 | (2006.01) | |
| G06F 1/16 | (2006.01) | |

(52) U.S. Cl.
CPC ....... G06F 1/3287 (2013.01); G05B 19/0423 (2013.01); G06F 1/1654 (2013.01); G06F 1/3237 (2013.01); G06F 1/3278 (2013.01); G05B 2219/13171 (2013.01); G05B 2219/23316 (2013.01); G05B 2219/25279 (2013.01); Y02B 60/126 (2013.01); Y02B 60/1221 (2013.01); Y02B 60/1282 (2013.01)

(58) Field of Classification Search
CPC ..... G06F 1/1654; G06F 1/3237; G06F 1/3278
See application file for complete search history.

(56) References Cited

U.S. PATENT DOCUMENTS

| | | | | |
|---|---|---|---|---|
| 5,216,674 A | * | 6/1993 | Peter ....................... | H04L 25/02 361/88 |
| 6,445,383 B1 | * | 9/2002 | Chambers ............. | G06F 1/3215 178/18.03 |
| 6,460,143 B1 | * | 10/2002 | Howard ................ | G06F 1/3203 713/323 |
| 6,625,738 B1 | * | 9/2003 | Shiga .................... | G06F 1/3215 710/67 |
| 8,738,952 B1 | * | 5/2014 | Lachwani ............. | G06F 1/3209 710/100 |
| 2002/0059514 A1 | * | 5/2002 | Hendry .................... | G06F 3/14 713/100 |

(Continued)

FOREIGN PATENT DOCUMENTS

| | | |
|---|---|---|
| DE | 39 26 178 A1 | 8/1989 |
| DE | 10 2006 062 603 A1 | 12/2006 |

OTHER PUBLICATIONS

EPO Search Report dated Oct. 29, 2013.
(Continued)

*Primary Examiner* — Thomas Lee
*Assistant Examiner* — Gary Collins
(74) *Attorney, Agent, or Firm* — Juneau & Mitchell

(57) ABSTRACT

A field device with a microprocessor and a display and/or operating module, which can be disconnected from the field device, with the microprocessor showing an energy saving module, in which the display and/or operating module are switched off, with the waking circuit being provided, which generates a waking signal when the display and/or operating module are disconnected from the field device or connected thereto.

11 Claims, 1 Drawing Sheet

(56) References Cited

U.S. PATENT DOCUMENTS

| | | | |
|---|---|---|---|
| 2004/0145580 A1* | 7/2004 | Perlman | G06F 3/147 345/204 |
| 2005/0144492 A1* | 6/2005 | Yun | G06F 1/305 713/300 |
| 2010/0144271 A1* | 6/2010 | Zhodzishsky | G06F 1/3209 455/41.2 |
| 2010/0156470 A1* | 6/2010 | Maltione | G06F 1/28 327/77 |
| 2011/0179297 A1* | 7/2011 | Simmons | G06F 1/325 713/323 |
| 2012/0109343 A1 | 5/2012 | Shah | |
| 2014/0153025 A1* | 6/2014 | Min | G06F 1/3206 358/1.14 |
| 2014/0160088 A1* | 6/2014 | Mercea | G06F 1/3259 345/179 |
| 2014/0192030 A1* | 7/2014 | Ryshtun | G06F 3/038 345/179 |
| 2014/0359312 A1* | 12/2014 | Halibard | G06F 1/3206 713/300 |
| 2015/0113425 A1* | 4/2015 | Noh | G06F 3/14 715/740 |
| 2015/0156032 A1* | 6/2015 | de Haas | H03K 5/2472 370/463 |
| 2016/0055009 A1* | 2/2016 | Sakamoto | G06F 9/4411 710/14 |

OTHER PUBLICATIONS

Office action (opinion of examination) for Taiwanese patent application 103124872, dated Nov. 6, 2017.

Search report accompanying office action for Taiwanese patent application 103124872, dated Nov. 2, 2017.

* cited by examiner

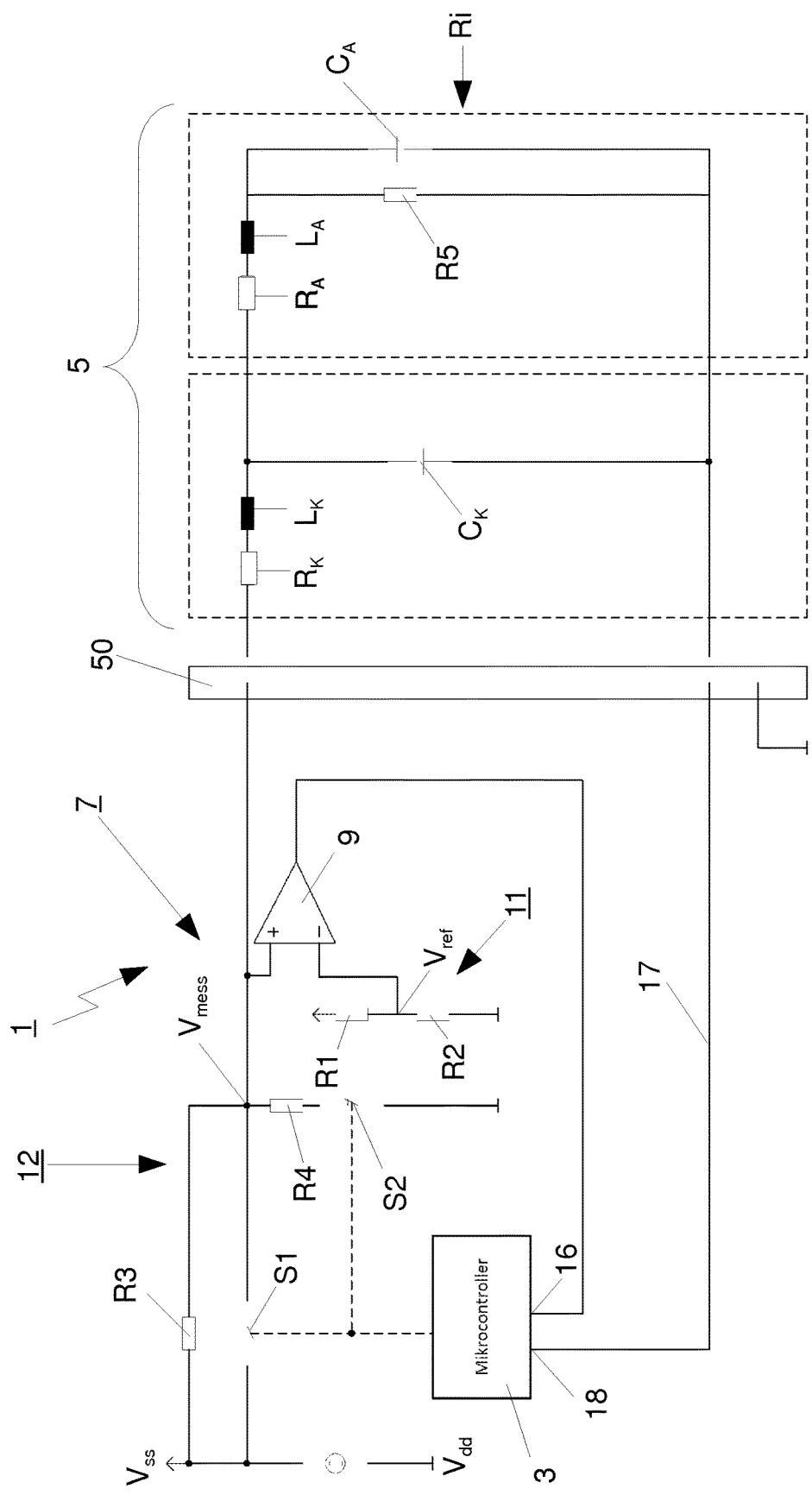

FIELD DEVICE

CROSS REFERENCE TO RELATED APPLICATIONS

This patent application claims priority European Patent Application 13 177 849.0, filed on Jul. 24, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a field device.

Background of the Invention

The current state of knowledge is as follows.

Such field devices are well known from prior art and comprise a microprocessor for controlling the field device and a display and/or operating module, which can be disconnected from the field device, with the display and/or operating module also being controlled by the microprocessor. The microprocessor here shows an energy saving mode, in which the display and/or operating module is switched off or deactivated so that this way, the energy consumption can be reduced.

Such an energy saving mode, which is also called standby mode, is particularly used in battery operated field devices in order to save the batteries used for the energy supply and thus yield a maximum operating life of the field device.

Further, microprocessors or micro controllers with different energy saving modes are known in which also, dependent on the energy saving mode, interfaces and processor clocks are deactivated in order to save energy. By deactivating the interfaces and clocks of the processor, it no longer shows the original scope of functions as in the active mode so that certain functionalities, particularly in the field of data input and output, and thus, also during the operation of the display and/or operating modules, for example displays, LED's, or other output devices, as well as keyboards are considerably restricted or no longer possible at all.

In order to allow termination of the energy saving mode, for example by entering data, it is common in prior art, to perform a so-called polling, i.e. cyclical inquiry for example of operating elements or periphery devices that can be connected, here. However, such a polling results in increased computing expense and thus, power consumption and additionally, it prevents the energy saving modes of the microprocessor, in which an internal clock and/or interfaces of the microprocessor are deactivated.

The objective of the present invention is to further develop a field device according to prior art such that even in an energy saving mode of a micro controller, in which an internal clock and/or interfaces of the micro controller are deactivated, display and/or operating modules are reliably detected, while avoiding both cyclic polling and any change of the display and/or operating module.

This objective is attained in a field device showing the features as claimed herein.

BRIEF SUMMARY OF THE INVENTION

In a preferred embodiment, a field device with a microprocessor and a display and/or operating module that can be disconnected from the field device, wherein the microprocessor comprises an energy saving mode in which the display and/or operating module is switched off, further comprising a waking circuit which generates a waking signal when the display and/or operating module is disconnected from the field device.

In another preferred embodiment, the field device as described herein, wherein the waking circuit comprises a comparator.

In another preferred embodiment, the field device as described herein, further comprising wherein a reference voltage and a measuring voltage are supplied to the comparator and the waking signal is generated when the measuring voltage is higher than the reference voltage.

In another preferred embodiment, the field device as described herein, wherein the waking circuit comprises a first voltage splitter with a serial connection comprising a first resistance, connected to a supply voltage, and a second resistance, connected to a ground potential at which the reference voltage can be tapped.

In another preferred embodiment, the field device as described herein, wherein the waking circuit comprises a measuring circuit at which the measuring voltage can be tapped, with the measuring circuit preferably being embodied as a second voltage splitter.

In another preferred embodiment, the field device as described herein, wherein the second voltage splitter shows a serial circuit comprising a third resistance and a fourth resistance, with the third resistance and the fourth resistance being sized such that in a parallel connection of the fourth resistance and the switched-off display and operating modules the measuring voltage is equivalent to the reference voltage.

In another preferred embodiment, the field device as described herein, wherein the third resistance and the first resistance are equally sized.

In another preferred embodiment, the field device as described herein, further comprising wherein a parallel connection of the fourth resistance to the display and/or operating module is equivalent to the second resistance.

In another preferred embodiment, the field device as described herein, wherein the first voltage splitter and/or the second voltage splitter are sized such that a current of less than 5 µA flows through both voltage splitters.

In another preferred embodiment, the field device as described herein, wherein the waking signal is supplied to an interrupt input of the microprocessor.

In another preferred embodiment, the field device as described herein, wherein the third resistance is switched parallel in reference to a first switch, which interrupts an energy supply of the display and/or operating module in the energy saving mode.

In another preferred embodiment, the field device as described herein, further comprising wherein a second switch is arranged between the fourth resistance and the ground potential, which in the energy saving mode connects the fourth resistance to the ground potential.

BRIEF DESCRIPTION OF THE DRAWINGS

FIG. 1 is a line drawing evidencing a simplified circuit diagram of a field device according to the invention.

DETAILED DESCRIPTION OF THE INVENTION

The field device according to the invention comprises a microprocessor and a display and/or operating module that can be disconnected from said field device, with the microprocessor comprising an energy saving mode, in which the display and/or operating module are switched off, and being characterized in a waking circuit, generating a waking signal when the display and/or operating module is disconnected from the field device and is subsequently connected to it once more.

Such an embodiment achieves that the monitoring of the preferably shut-off display and/or operating module can occur based on the internal resistance at an interface to the field device and a change of the monitored resistance leads to the generation of a waking signal. Such monitoring can be realized in a particularly simple fashion when the waking switch shows a comparator. The comparator can perform a voltage monitoring, for example, with the comparator being fed with a reference voltage and a measuring voltage and generating the waking signal, when the measuring signal is below the reference voltage. With the use of such a voltage monitoring, for example an internal resistance of the display and/or operating module can be monitored, with any change of the monitored resistance, i.e. disconnecting or connecting the display and/or operating module, leading to a change of the measuring voltage, causing in a suitable circuitry the generation of the waking signal by the comparator.

As an alternative to monitoring the internal resistance of the connected display and/or operating module, the present invention may also be used for a capacitive or inductive monitoring, for example, of a capacity or inductivity applied to the interface 50.

The present invention can be used in a particularly beneficial fashion when existing display and/or operating modules shall not be modified and particularly any installation of additional switches and/or lines shall be avoided.

Preferably, the first waking circuit shows a first voltage divider, which is formed, for example, with a series connection of a first resistance, which is connected to a supply voltage and a second resistance, connected to a ground potential, with it being possible to tap the reference voltage at the interface of the two resistances.

By the use of a voltage part, it can be achieved that the reference voltage can be generated with very little power consumption in the range of microamperes or nano amperes.

The waking circuit preferably comprises a measuring circuit, at which the measuring voltage can be tapped, with the measuring circuit preferably being formed as a second voltage divider. The second voltage divider is here designed preferably as a serial connection comprising a third resistance and a fourth resistance, with the third resistance and the fourth resistance being sized such that in a parallel switching of the fourth resistance and the shut-off display and/or operating module the measuring range is equivalent to the reference voltage.

By using a voltage divider, as mentioned above, a measuring voltage can be generated with very little power consumption, with by the parallel switching of the fourth resistance and the display and/or operating module any connecting and/or disconnecting of the display and/or operating module to the field device directly influencing the measuring voltage.

A particularly simple embodiment is achieved when the third resistance and the first resistance are sized identical, i.e. show the same dimension. Preferably, here, resistances are used in the range of a few mega ohms, so that the power consumption of the waking circuit is thereby reduced.

When designing the voltage divider, it is additionally advantageous when a parallel circuit of the fourth resistance and the shut-off display and/or operating module are equivalent in their size to the second resistance.

Preferably, the first voltage divider and/or the second voltage divider is sized such that current of less than 5 micro amperes flows through the voltage divider.

In a further development of the invention, the waking signal issued by the waking circuit, preferably the comparator, is fed to an interrupt-input of the microprocessor such that it can also be woken up from a deep energy saving mode in which, for example, the processor clock and the processor interfaces are deactivated.

The interrupt signal may be a simple port-interrupt, for example, which can be used even without any system clock and activation of the respective interfaces of the micro controllers, in order to wake it from the energy saving mode.

Activating the wake-up circuit can also occur, for example, by the third resistance being switched parallel to a first switch, which interrupts an energy supply of the display and/or operating module in the energy saving mode and preferably a second switch is arranged between the fourth resistance and the ground potential, which connects the fourth resistance to the ground potential in the energy saving mode. This way, the second voltage divider acting as a measuring circuit is shut off during normal operation and is only activated in case of a transfer to the energy saving mode, in which the display and/or operating module are shut off.

In the following, the present invention is explained in greater detail with reference to the attached FIGURE.

DETAILED DESCRIPTION OF THE FIGURES

FIG. 1 shows a simplified circuit diagram of a field device 1 according to the invention, with this schematic illustration of the field device 1 only showing the micro controller 3 controlling the field device 1, a display and/or operating module 5 that can be connected to the field device, as well as a waking circuit according to the invention. Additional essential components, such as sensors and corresponding signal processing units, typically provided in the field device 1 and controlled by the micro controller 3, are not shown in FIG. 1 for reasons of visibility.

The field device 1 is connected via an interface 50 to the display and/or operating module 5, with in the present exemplary embodiment a serial communication being provided between the field device 1 and the display and/or operating module 5. Here, serial communication is advantageous in that, compared to a parallel communication, considerably fewer lines are required and thus, particularly in case of long lines, the energy consumption can be reduced. Furthermore, the wiring expense and the wiring costs can be kept low. The micro controller 3 is connected on the one side via a data line 17 to the interface 50 and via the interface 50 to the display and/or operating module 5, with via the interface 50 simultaneously an energy supply occurring of the display and/or operating module 5.

The display and/or operating module 5 shows an internal resistance Ri, which can be represented essentially and particularly in the static range by a resistance R5. In order to refine a replacement switch of the display and/or operating module 5, additionally a replacement diagram can be used for the cable connected, which results from switching a cable resistance RK a cable inductivity L K and a cable capacity CK. Additionally, other inductivities, capacities, and resistances of the actual display unit RA, LA, CA can be used, with in the simplest case a measuring occurring of the internal resistances Ri and a subsequent comparison of the reference voltage Vref.

In the present exemplary embodiment, the waking circuit 7 comprises as a central component a comparator 9, which is designed with a first voltage divider 11, showing a first resistance R1 and a second resistance R2, with the serial connection of the resistances R1, R2 being switched to a supply voltage VSS and a ground potential Vdd. The reference voltage Vref can be tapped between the resistances R1, R2, which is fed to the comparator 9 at its inverting input. At its non-inverting input, the comparator 9 is provided with a measuring voltage Vmess, which is generated by a second voltage divider 12, which is generated from a serial circuit of a third resistance R3 and a fourth resistance R4, which is switched parallel in reference to the display and/or operating module 5.

The micro controller 3 additionally controls a first switch S1 and a second switch S2, with the first switch S1 interrupting an energy supply of the display and/or operating module 5 during a transition to an energy saving mode so that the display and/or operating module 5 is switched off. The first switch S1 is switched parallel in reference to a third resistance R3 so that in the normal operation of the field device 1 is bridged by the closed switch S1 and thus, it is switched off during normal operation. In order to save energy during normal operation, additionally a second switch S2 is provided between the fourth resistance R4 and the ground potential Vdd of the second switch S2, which is open in the normal operation and is closed in the energy saving mode so that during normal operation no current flows through the fourth resistance R4 and thus, no energy is consumed.

In the present exemplary embodiment, the first resistance R1 and the third resistance R3 are selected with equal size so that here dimensioning of the voltage portions 11, 12 occurs such that the parallel circuits of the fourth resistance R4 and the internal resistance Ri of the display and/or operating module 5 show the same size as the second resistance R2 of the first voltage divider 11.

If now the field device 1 is transferred into the energy saving mode, due to the identical embodiment of the voltage dividers 11, 12, the measuring voltage Vmess and the reference voltage Vref shows the same value so that the comparator 9 issues no waking signal. When the display and/or operating module 5 is removed from the field device 1 by a plug-in connection being disconnected at the interface 50 here, the current through the second voltage divider 12 changes as well as the voltage dropping at the fourth resistance R4 so that the measuring voltage Vmess increases compared to the reference voltage Vref and thus, a resort signal is issued to an interrupt port 16 of the micro controller 3. By such an interrupt signal the micro controller 3 is awakened from the energy saving mode and activated so that the internal clock and thus, also, the respective interfaces, for example the data interface 18.

A respective waking circuit 7 can be used not only in battery operated field devices but also in line-powered devices in order to save energy, avoid polling events, and thus, using the computing time of the microcomputer freed thereby for other tasks or to save respective computing times and thus energy.

LIST OF REFERENCE NUMBERS

1 Field device
3 Microprocessor
5 Display/Operating module
7 Waking circuit
10 Interface
11 first voltage splitter
12 second voltage splitter
14 Measuring circuit
16 Interrupt input
17 Data line
18 Data input
RA Resistance
LA Inductivity
CA Capacity
RK Line resistance
LK Line inductivity
CK Line capacity
Vref Reference voltage
Vmess Measuring voltage
R1 first resistance
R2 second resistance
R3 third resistance
R4 fourth resistance
R5 fifth resistance
Ri Internal resistance
S1 first switch
S2 second switch
VSS Supply voltage
Vdd ground potential The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A field device with a microprocessor and a display and/or operating module that can be disconnected from the field device, wherein the microprocessor controls the field device as well as the display and/or operating module, the microprocessor comprises an energy saving mode in which the display and/or operating module is switched off, wherein an energy supply of the display and/or operating module is interrupted during a transition by the microprocessor to the energy saving mode, further comprising a waking circuit which generates a waking signal when the display and/or operating module is connected to the field device, wherein the waking circuit comprises a comparator, a reference voltage and a measuring voltage are supplied to the comparator, the waking circuit comprises a measuring circuit at which the measuring voltage can be tapped, and connecting the display and/or operating module leads to a change of the measuring voltage that causes the generation of the waking signal by the comparator and wherein the measuring circuit is embodied as a second voltage splitter showing a serial circuit comprising a third resistance and a fourth resistance, with the third resistance and the fourth resistance being sized such that in a parallel connection of the fourth resistance and the switched-off display and operating modules the measuring voltage is equivalent to the reference voltage.

2. The field device of claim 1, wherein the waking signal is generated when the measuring voltage is higher than the reference voltage.

3. The field device of claim 1, wherein the waking circuit comprises a first voltage splitter with a serial connection comprising a first resistance, connected to a supply voltage, and a second resistance, connected to a ground potential at which the reference voltage can be tapped.

4. The field device of claim 3, wherein the first voltage splitter and/or the second voltage splitter are sized such that a current of less than 5 μA flows through both voltage splitters.

5. The field device of claim 1, wherein the third resistance and the first resistance are equally sized.

6. The field device of claim 1, further comprising wherein a parallel connection of the fourth resistance to the display and/or operating module is equivalent to the second resistance.

7. The field device of claim 1, wherein the waking signal is supplied to an interrupt input of the microprocessor.

8. The field device of claim 7, wherein the waking signal wakes the microprocessor from a deep energy saving mode in which the processor clock and the processor interfaces have been deactivated.

9. The field device of claim 1, wherein the third resistance is switched parallel in reference to a first switch, which interrupts an energy supply of the display and/or operating module in the energy saving mode.

10. The field device of claim 1, further comprising wherein a second switch is arranged between the fourth resistance and the ground potential, which in the energy saving mode connects the fourth resistance to the ground potential.

11. The field device of claim 1, wherein the waking signal is a simple port-interrupt, used without any system clock and activation of respective interfaces of any micro controllers.

* * * * *